United States Patent [19]
Cohen

[11] Patent Number: 6,167,252
[45] Date of Patent: Dec. 26, 2000

[54] SECURITY FOR A MOBILE OR PERSONAL COMMUNICATIONS DEVICE HAVING AN IDENTIFICATION CODE

[75] Inventor: Paul E. Cohen, San Jose, Calif.

[73] Assignee: NEC Electronics, Inc., Mountain View, Calif.

[21] Appl. No.: 08/703,497

[22] Filed: Aug. 27, 1996

[51] Int. Cl.[7] .................................................. H04M 11/00
[52] U.S. Cl. ......................... 455/410; 455/411; 455/550; 455/95; 380/23
[58] Field of Search ...................................... 455/410, 411, 455/33.1, 455, 551, 564, 54.2, 89, 95; 340/825.34, 825.35, 825.33; 379/355, 356, 95, 96; 380/23, 49

[56] References Cited

U.S. PATENT DOCUMENTS

| | | | |
|---|---|---|---|
| 5,337,345 | 8/1994 | Cassidy et al. | 379/58 |
| 5,392,356 | 2/1995 | Konno et al. | 380/23 |
| 5,444,664 | 8/1995 | Kuroda et al. | 365/226 |
| 5,557,676 | 9/1996 | Naslund et al. | 380/23 |
| 5,608,781 | 3/1997 | Seiderman | 379/59 |
| 5,771,446 | 6/1998 | Wilkinson | 455/410 |
| 5,793,749 | 8/1998 | Helwig et al. | 370/241 |
| 5,812,856 | 9/1998 | Halahmi | 395/709 |
| 5,960,393 | 9/1999 | Cohrs et al. | 704/240 |

OTHER PUBLICATIONS

NEC Electronics, Inc., IS–54 Dual Mode Cellular Telephone Baseband Processing Chipset, Feb. 1995, pp. 1–4, Product brief.

*Primary Examiner*—Daniel S. Hunter
*Assistant Examiner*—Pablo Tran
*Attorney, Agent, or Firm*—Skjerven, Morrill, MacPherson, Franklin & Friel, L.L.P.; Stephen A. Terrile

[57] ABSTRACT

A device that broadcasts an electronic serial number, or ESN, is made secure from cloning using one or more of a plurality of measures, including coupling the memory used for storing the ESN more closely to the ESN processor, fabricating the ESN memory as part of the ESN processor, including the ESN memory in another processor and encrypting communications between the other processor and the ESN processor, and comparing multiple copies of the ESN stored in different memories. The later technique is also effective in securing the JTAG port of an ESN processor.

25 Claims, 10 Drawing Sheets

<.............ESN...........

| 1 | 0 | 0 | 0 | 0 | 0 | 0 | 1 | 1 | | | | | | |

.............................ESN............................................

| 0 | | | | | | | | | | | | | | |

...........................ESN............................>

| 0 | | | | | | | | | | | | | 0 | 0 | 0 |

FIG. 7

SECURITY FOR A MOBILE OR PERSONAL COMMUNICATIONS DEVICE HAVING AN IDENTIFICATION CODE

BACKGROUND OF THE INVENTION

1. Field of the Invention

The present invention relates to security for a mobile or personal communications device, and more particularly to security for a mobile or personal communications device that is assigned and broadcasts an identification code.

2. Description of Related Art

Personal communications generally and mobile telephony in particular have become important tools in our society. Unfortunately, the widespread popularity of mobile telephones has created opportunities for thieves to steal mobile telephones, and to "clone" legitimate mobile telephones from the stolen telephones for stealing carrier services. Carrier service theft is the unauthorized billing of calls to a legitimate subscriber. Mobile telephone theft and especially carrier service theft have grown to the point where they now have a serious economic impact. Carrier service theft in the United States is costing service providers approximately $480 million per year, although more recent estimates put losses as high as one billion dollars. New York Times, Oct. 19, 1995, p. A13. Theft of service is naturally more of a concern to service providers than to telephone manufacturers, but service providers play a critical role in marketing mobile telephones. These providers would prefer to promote mobile telephones that are difficult to use in cloning because they have a strong interest in reducing the number of cloned mobile telephones that can be used to steal carrier services. End users too would prefer to own mobile telephones that thieves will not steal because they are not easily used to clone legitimate mobile telephones.

The FCC requires that every mobile telephone be identified by an Electronic Ser. No. ("ESN"). The ESN is encoded as a 32 bit number, the high order eight bits of which are a manufacturer's code, the low order 18 bits are uniquely assigned to a mobile station, and the remaining bits are unassigned. ESN security is included in various standards jointly adopted by the Electronics Industries Association and the Telecommunications Industries Association, e.g. EIA/TIA IS54B, IS55, IS85 and IS136. See, e.g., ELA/TIA, Interim Standard: Cellular System Dual-Mode Mobile Station—Base Station Compatibility Standard, IS-54-B, April 1992. The ESN is programmed by the manufacturer, and is not readily susceptible to field modification for security purposes. Under the IS54B standard, for example, the ESN may not be stored in re-programmable memory or in any socketed device. Beyond that restriction, how the manufacturer is to protect against field modification is not specified by the EIA/TIA standards.

The ESN is used in conjunction with a mobile identification number, or MIN, to identify a subscriber of a legally owned mobile telephone. The MIN is essentially the telephone number of the mobile station, and is programmed into the mobile telephone by a service provider when service is established. MIN encodes seven digits as a 24-bit number named MIN1 and a three digit area code that is encoded as a 10-bit number MIN2. During registration, which is the process of identify a subscriber of a legally owned mobile telephone while the telephone is put into service, an ESN secured mobile telephone openly broadcasts its MIN and its ESN.

Even though the MIN is easily changeable, a mobile telephone is secure if its ESN is not vulnerable to field modification. In the event of theft, service to that telephone may be discontinued once the legal owner reports its loss to the service provider. However, when a mobile telephone design does not adequately protect the unit's ESN against modification, the stolen telephone, just like a legally purchased one, can be used to steal service. Mobile phone theft and cloning occur despite the use of ESN security because thieves have developed techniques for defeating it. The first step in cloning a legitimate mobile telephone to a stolen mobile telephone is to collect valid pairs of MIN and ESN numbers, which is typically done by listening to mobile stations registering with base stations. The next step in cloning is to program a legitimate MIN and ESN pair into a stolen or legally acquired mobile telephone.

Techniques for programming legitimate MIN and ESN pair into a stolen or legally acquired mobile telephone are well known by thieves. Manufacturing requirements have in the past caused manufacturers to put the ESN in memory device that can be selectively erased and programmed. In certain older mobile telephones, the MIN and ESN may be changed through the normal service port. In other mobile telephones, the MIN and ESN may be changed by access to the circuit board, which requires opening the case. These modifications may need to be performed each time the MIN/ESN pair is changed, although some units permit modifications to their controller code so that MIN and ESN numbers subsequently can be changed simply by entering them on the telephone keypad. Thieves learn of these techniques by compromising manufacturers security measures, or by a repetitive trial-and-error process of attempted modification known as hacking.

An illustrative implementation for the IS-54B standard is the NEC IS-54 dual mode cellular telephone base band processing solution available from NEC Electronics, Inc. of Mountain View, California. The block diagram of the NEC IS-54 solution is shown in FIG. 1. The NEC IS-54 solution consists of four chips, an IF interface 120, a digital interface 130, a base band processor 140 (a digital signal processor, or DSP), and an audio CODEC 150. Additional components needed to implement a cellular telephone 100 include an antenna 102, an antenna switch 104, a receive amplifier 106, a transmit amplifier 108, an IF/RF unit 110, a speaker 152, a microphone 154, a microcontroller 160 (a host controller), and an ESN ROM 170. Switch 104 directs signals from the antenna 102 to the receive amplifier 106 in receive mode, and from the transmit amplifier 108 to the antenna 102 in transmit mode. The IF/RF unit 110 provides an oscillator and modulation/demodulation functions. The IF interface 120 provides analog-to-digital and digital-to-analog conversion functions. The digital interface 130 provides TDMA control, WBD voice control, and clock signals. The base band processor 140 provides equalization, channel and speech CODEC functions, AMPS audio processing, AMPS SAT processing, and AMPS WBD MODEM processing. These functions require a great deal of bit processing but only modest "intelligence." CODEC 150 provides audio coding and decoding functions. Protocol control, high level system control, message assembly, and security functions of the mobile telephone 100 are handled by the microcontroller 160, which is connected to the digital interface 130 and the base band processor 140. An ESN memory 170, typically a random access memory ("ROM"), containing the ESN is connected to the microcontroller 160. Flash EEPROM and mask ROM are suitable for use as ESN memory, but mask ROM is rarely used because it forces manufacturers to serialize their mobile telephones during manufacture. A JTAG port 180 is coupled to various circuits of the mobile telephone 100, including the digital interface 130, the base band processor 140, and the microcontroller 160.

Generally, a mobile telephone is most vulnerable to cloning through the interfaces between the chips of the mobile telephone chip set. The least vulnerable of these component interfaces are on the RF side of the cellular telephone 100, viz. the interfaces at the IF/RF unit 110 and the IF interface 120, because the data on those interfaces is so intricately coded. Perhaps the most vulnerable of the interfaces is that between the processor carrying out the security functions and the memory device in which the ESN is stored. For example, in the cellular telephone 100 of FIG. 1, the ESN is stored in ESN ROM 170. If the ESN ROM 170 can be removed, then the ESN can be changed.

In another approach to cloning, the ESN memory component is not physically removed from the mobile telephone, but instead logic circuitry is attached at the interface of the memory component to override its behavior. For example, in FIG. 1, a logic circuit may be connected to interconnects between the ESN ROM 170 and the microcontroller 160 which manages the ESN. Similarly, logic may be inserted at the interface between a host controller and a DSP to modify the commands from the host controller that cause the ESN to be transmitted to the base station. For example, in FIG. 1, a logic circuit may be connected to interconnects between the microcontroller 160, which manages the ESN, and the base band processor 140.

ESN security at the ESN memory—host controller interface may be improved by encrypting the stored ESN. In one approach, an external dumb but nonvolatile memory device such as EPROM, EEPROM or Flash memory stores the encrypted ESN. Such memory is readily available in standard form, and advantageously at low cost. A variety of coding schemes and coding keys may be used. Once selected, the coding scheme and coding key are fixed, and provide effective security so long as the coding method is not compromised. However, the fixed nature of the coding scheme affords a thief time to break the coding, and even an encryption scheme that is extremely difficult to break by technical means can be violated by compromising individuals. Still, some deterrence is achieved because cloning is made more difficult.

The JTAG interface of the controller and DSP, which is the communications port for the DSP's debugger, is also a vulnerable point. For example, in FIG. 1, the JTAG functions of the base band processor 140 and the microcontroller 160 is accessible through the JTAG terminal 180. Although the debugger does not permit disassembly or other interrogation of instruction memory, the debugger may be used to set breakpoints in the controller's code and examine the contents of registers and memory to determine whether the ESN resides for any length of time in a particular location in one of the DSP's registers or in data memory. Typically, the ESN will reside in a register at some time. Once the register location is determined, the thief sets a particular breakpoint to allow modification of the ESN.

Another technique for providing mobile telephone security is authentication, as discussed in TIA/EIA Telecommunications Systems Bulletin: Recommended Minimum Procedures for Validation of Authentication of IS-54-B Mobile Stations, TSB46, March 1993. When a base station demands authentication of a mobile station, the mobile station broadcasts a number that is computed from the ESN, the MIN, and some secret data that is shared between the mobile station and the service provider's network. Unfortunately, the authentication procedure has not yet been widely implemented because of complexity and cost issues. To support authentication, the base station must know the secret data of the mobile station. This knowledge must be widely shared on carrier networks, which complicates the implementation of those networks.

A further motivation for manufacturers to improve ESN security is recently promulgated FCC regulation 22.919, which requires of any mobile telephone certified in the future that it not be possible to change the ESN. TIA/CTIA is presently attempting to soften this restriction and allow manufacturers to change the ESN, but some fairly stringent restrictions seem likely to remain.

Accordingly, a need exists for low cost, improved methods and apparatus to prevent or deter cloning.

SUMMARY OF THE INVENTION

The invention relates to making secure from cloning a device that broadcasts an electronic serial number (ESN) using one or more of a plurality of measures. The measures include coupling the memory used for storing the ESN more closely to the ESN processor, fabricating the ESN memory as part of the ESN processor, including the ESN memory in another processor and encrypting communications between the other processor and the ESN processor, and comparing multiple copies of the ESN stored in different memories. The later technique is also effective in securing the JTAG port of an ESN processor.

In a preferred embodiment, the invention relates to a clone-resistant apparatus using electronic serial number ("ESN") security. The apparatus includes a host controller; a digital signal processor having a digital systems interface coupled to the host controller and a radio frequency interface; an RF section coupled to the radio frequency interface; and an ESN memory coupled to the digital signal processor.

In another embodiment, the invention relates to a method for operating the a clone-resistant apparatus. The method includes the steps of placing the ESN in a first or second position in a WBD command; using a first binary value to identify whether the ESN is present in the WBD command; using a second binary value to identify whether the ESN is present in the first or the second position; examining the first binary value using the DSP to determine whether a substitution should be made; and in the event that the first binary value examining step indicates that a substitution should be made, examining the second binary value using the DSP to determine whether the substitution should be made to the first location or to the second location

BRIEF DESCRIPTION OF THE DRAWINGS

In the drawings, where like reference characters indicate like parts, . . .

FIG. 7 is a schematic block diagram of a mobile telephone architecture in accordance with another aspect of the invention;

DETAILED DESCRIPTION OF THE PREFERRED EMBODIMENT

The techniques described herein for securing a mobile telephone against cloning are useful in any application in which an apparatus is assigned an ESN and transmits its ESN in such a way that it may be received by other than the intended recipient. While the techniques described herein are in the context of a mobile telephone chipset, they are applicable to a variety of mobile devices and personal devices, including personal data assistants and information managers, that have communications ability and are assigned and broadcast an identification code. The techniques may be practiced individually or in various combinations to improve device security.

Elimination of Vulnerability at the Host Controller—DSP Interface

Figure 1:
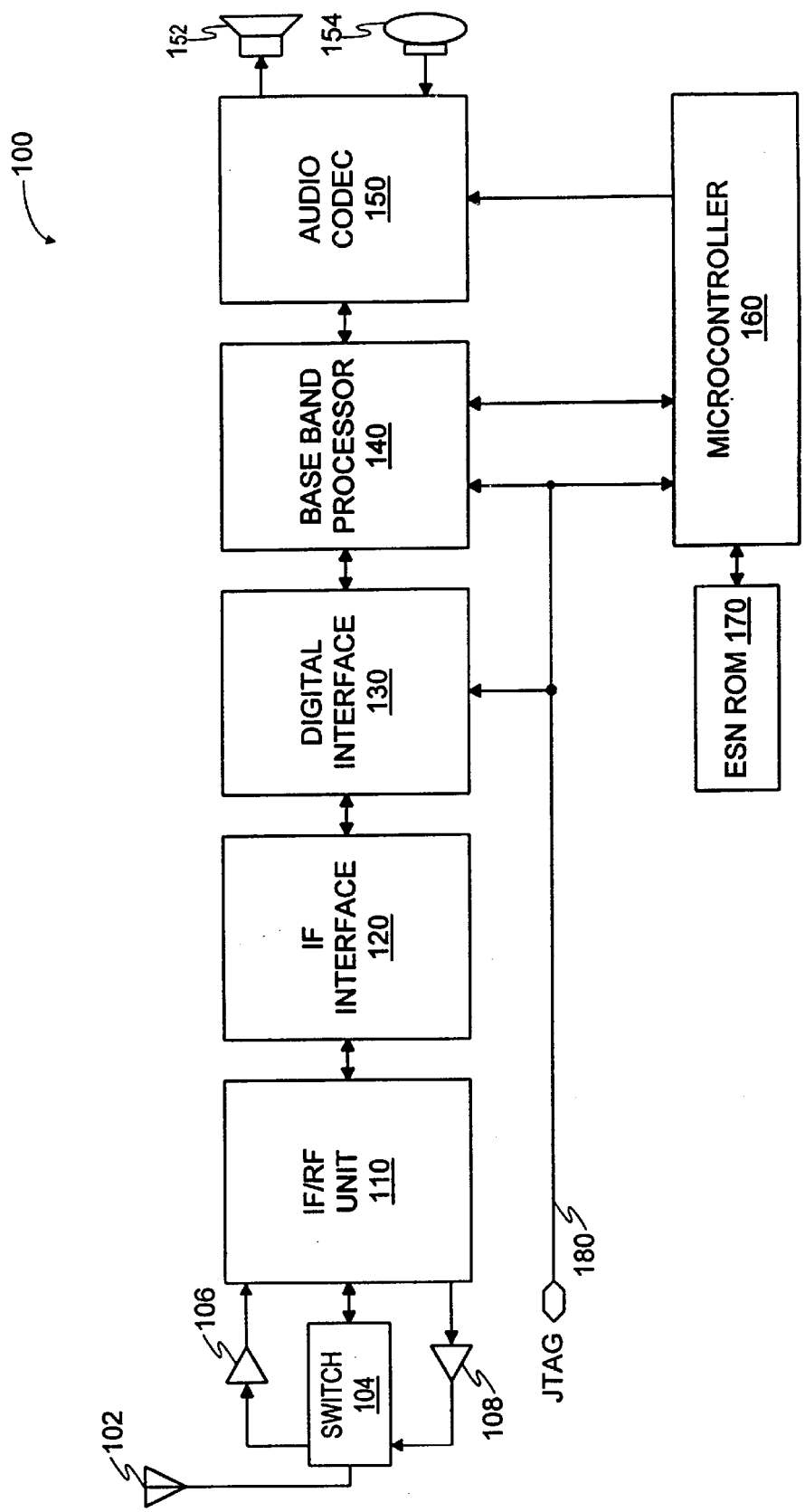
FIG. 1 is a schematic block diagram of a prior art mobile telephone architecture.

ESN security typically is managed by a host functional unit such as the microcontroller 160 (FIG. 1) (the term "functional unit" used hereinafter is generic to the terms processor, microprocessor, controller, microcontroller, and like terms) under program control, and can be compromised by modification of the security data or the security software. An exposed interface of the ESN-aware functional unit provides an opportunity for a thief to affect ESN management so that the ESN itself can be changed or the ESN can be furnished to the ESN-aware functional unit from somewhere other than from where it was intended by the manufacturer. Hence, one measure for improving the protection against clothing is to reduce the number of interfaces that are vulnerable to attack. The mobile telephone architecture 200 of FIG. 2 reduces vulnerability by eliminating ESN management through the easily accessible memory-host interface and the host-DSP interface in favor of ESN management through a memory-DSP interface. The base band processor 240 is a DSP that is designed to manage the ESN itself, i.e. is made ESN-aware, and directly interfaces with memory, e.g. the ESN memory 170 holding the ESN, for ESN management purposes. A mask ROM 242 contains instructions to control the ESN awareness of the base band processor 240. A separate functional unit such as a microcontroller having a suitable instruction memory such as mask ROM may also be used, if desired. The microcontroller 260 performs the same functions as the microcontroller 160 (FIG. 1), except that it does not manage the ESN.

Figure 2:
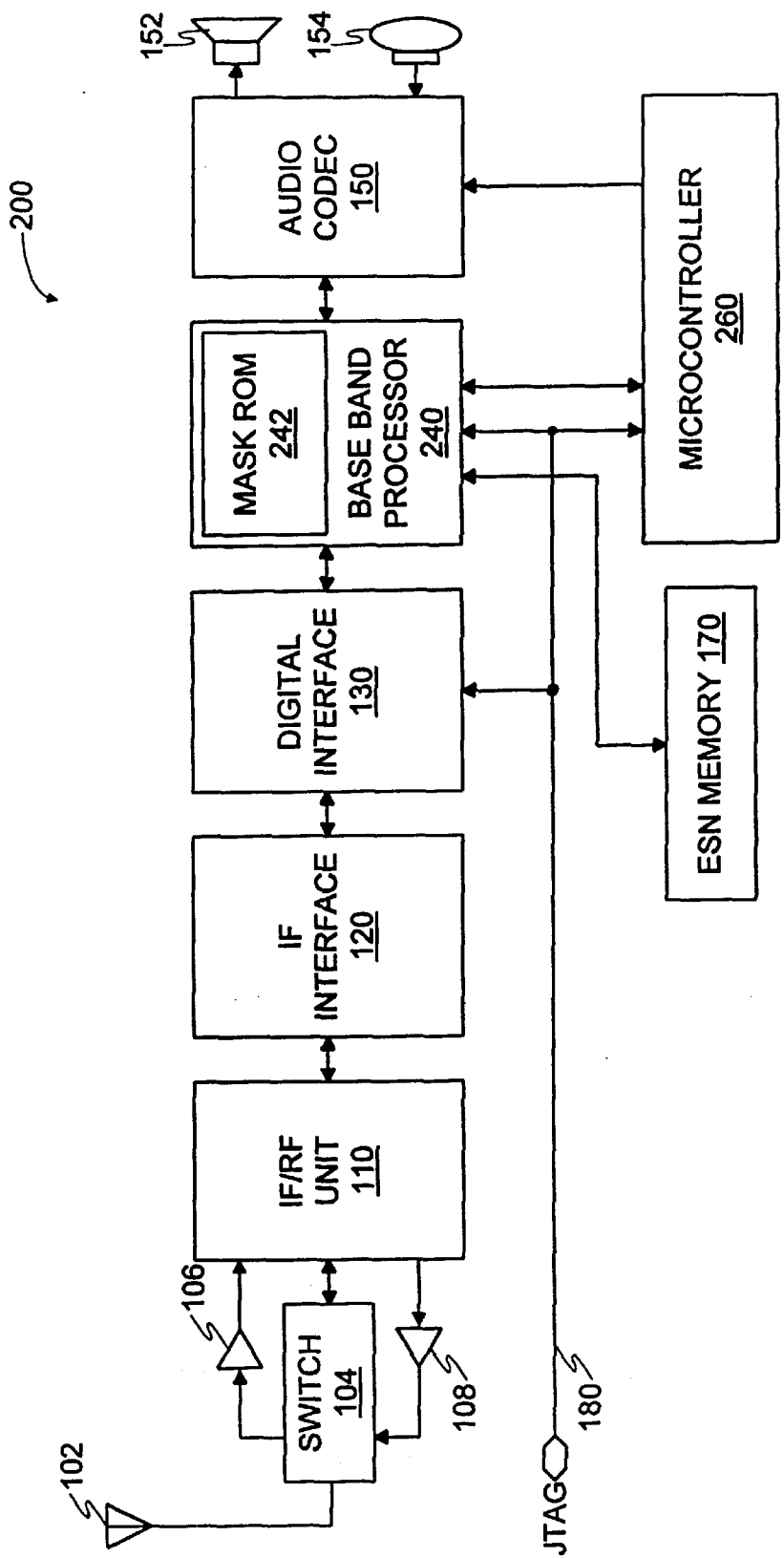
FIG. 2 is a schematic block diagram of a mobile telephone architecture in accordance with one aspect of the invention.

The mobile telephone architecture 200 of FIG. 2 reduces by one the number of vulnerable interfaces, and reduces the incentive to attack the most vulnerable component of the mobile telephone, the host functional unit (e.g. the microcontroller 160 of FIG. 1) from attack. No change to the software of the microcontroller 260 can compromise the ESN. While modification of the software of the DSP 240 can compromise the ESN, the software of the DSP 240 preferably is contained in the mask ROM 242 and cannot be modified without cloning the entire DSP solution. The complexity and cost of cloning the entire DSP solution deters thieves from obtaining cloned DSPs.

The base band processor 240 manages the ESN through a control program stored in any suitable memory, but preferably in a nonvolatile and tamper-proof memory such as the mask ROM 242. Illustratively, the control program is based on the current host interface definition of the IS-54-B specification. Section 2.7.1 of the specification describes the different kinds of wide band data ("WBD") that a mobile station can transit on the reverse analog control channel, or "RECC." An RECC message consists of a combination of one to six 48-bit words selected from words named Word-A, Word-B, Word-C, Word-D and Word-E. Word-A, which is the abbreviated word address, is always part of each RECC message. Word-A includes the 24-bit field MIN1, so this much identification is included in every RECC message. Word-A also includes the three bit field NAWC, which indicates how many 48-bit words are included in the RECC message. Word-A also includes and a one-bit field E which indicates whether Word-B, the extended address word containing MIN2, is part of the RECC message. If E is set (logical 1), the extended address word is in the RECC message; otherwise it is not. Word-A also includes a one-bit field S which indicates whether Word-C, the serial number word containing the 32-bit ESN, is part of the RECC message. If both E and S are set (logical 1), the serial number word is the third word of the RECC message following the extended address word. If E is not set (logical 0) and S is set (logical 1), the serial number word is the second word of the RECC. The serial number word is absent from the RECC message if S is not set (logical 0). Security can be enhanced if these appearances of the ESN are protected from interception by the thief.

Figure 3:
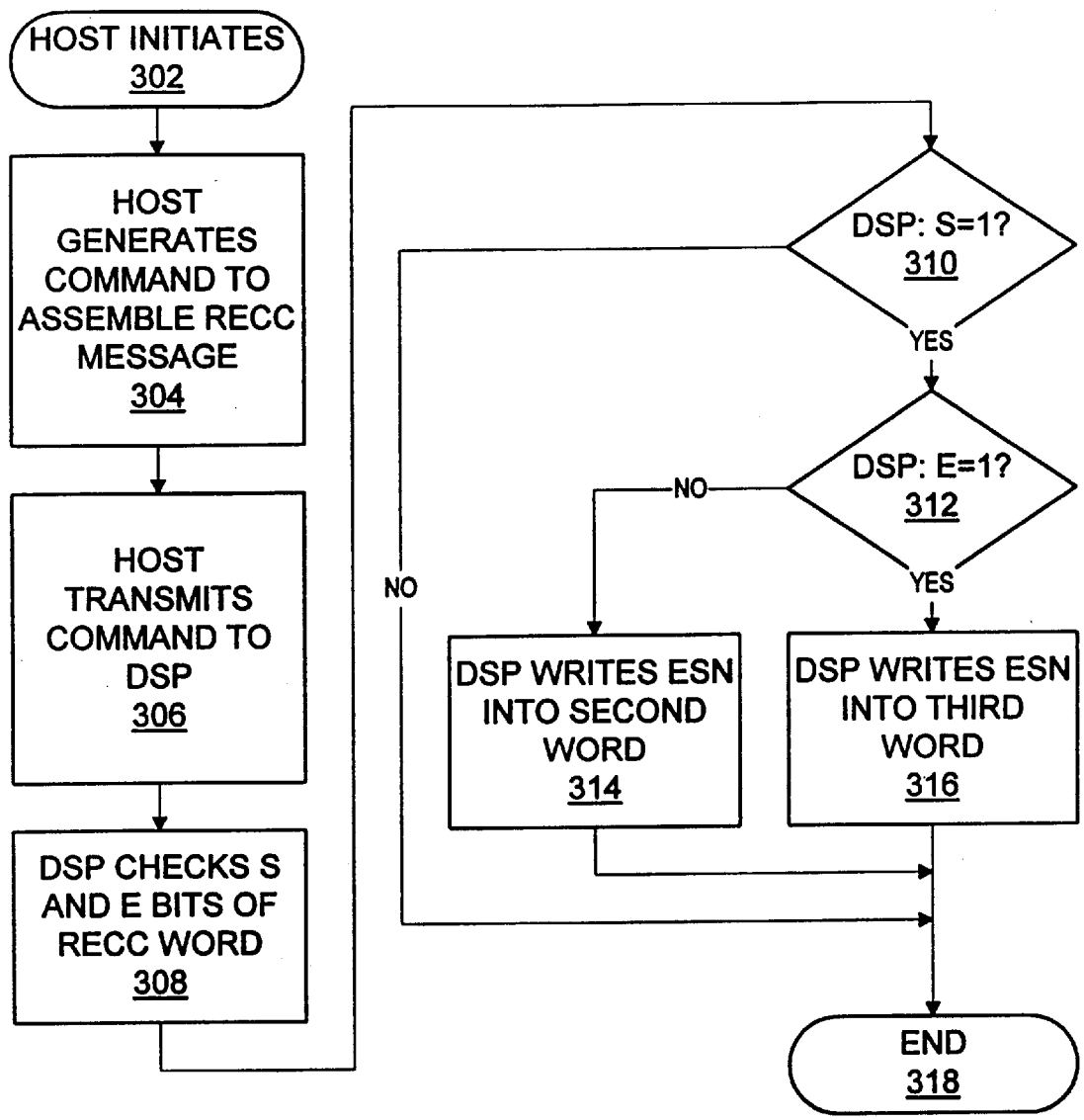
FIG. 3 is a flow chart of a method implemented on the architecture of FIG. 2.
Figure 4:
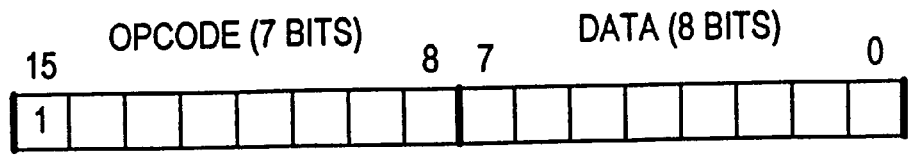
FIG. 4 is a schematic illustration of an ESN.
Figure 5:
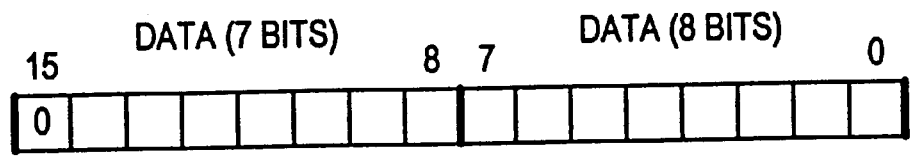
FIG. 5 is a schematic block diagram of a mobile telephone architecture in accordance with another aspect of the invention.

An illustrative flowchart of a control program based on the current host interface definition of the IS-54-B specification is shown in FIG. 3. The microcontroller 260 acting as host controller initiates transmission of a WBD command, a process which includes the partial construction of 36 bits of a word of an RECC message. An additional 12 bits, the parity field, are added by the base band processor 240. The microcontroller 260 sends a signal to wake the base band processor 240 from IDLE mode, which is when a mobile telephone is registered and monitoring a reverse analog control channel, and sends a series of commands to the base band processor 240 over its 8-bit wide host interface to assemble the RECC message. Each command is composed of three 16-bit words generally of the form shown in FIGS. 4 and 5. FIG. 4 shows the format of the first word of a command, which is composed of a 7-bit opcode field and an 8-bit data field. FIG. 5 shows the format of the second and subsequent words of a command, which is composed of a 7-bit data field and an 8-bit data field. Hence, each command contains 36 bits of data, which are found in eight data bits in the first word, fifteen data bits in the second word, and thirteen data bits in the third word, which is right padded with two zeros.

Figure 6:
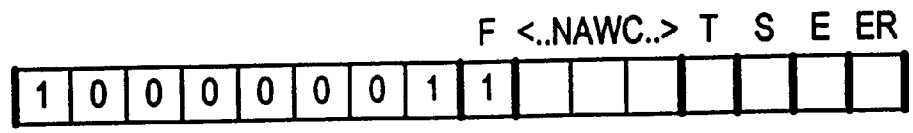
FIG. 6 is a flow chart of a method implemented on the architecture of FIG. 5.
Figure 6:
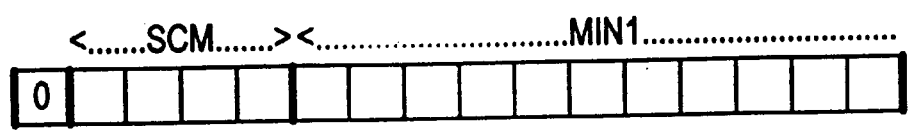
Figure 6:
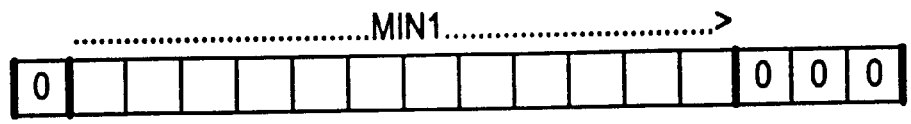
Figure 7:
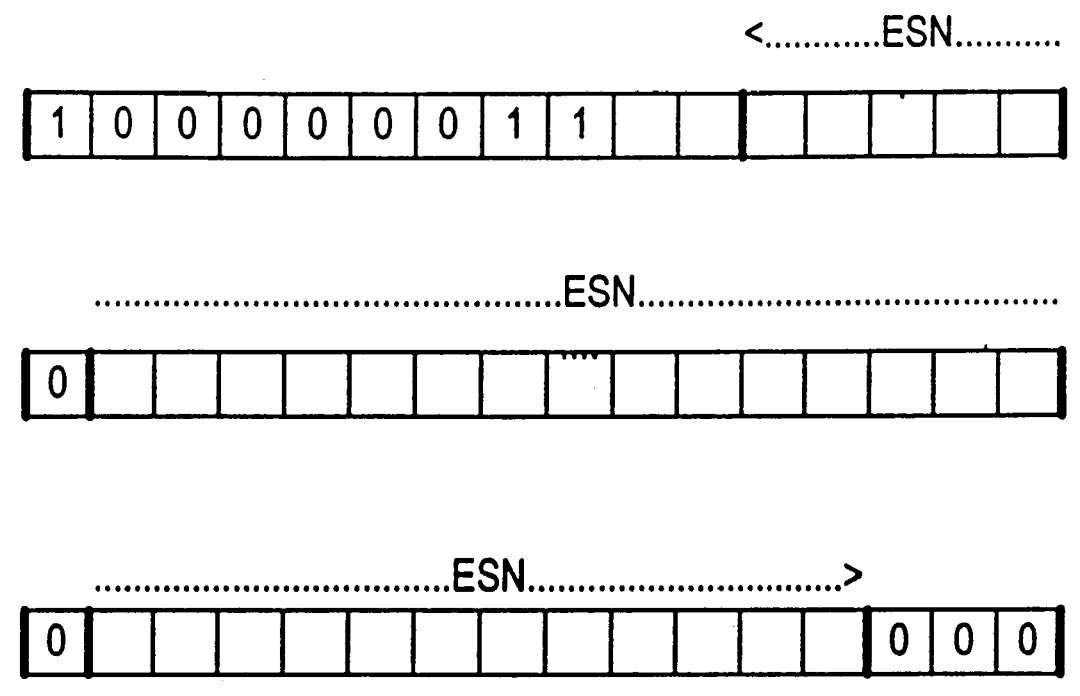

The specific command used by the microcontroller 260 for constructing a word of the RECC message is the WBDTX message, or opcode 81 Hex. Word-A is conveyed in the three word command illustrated in FIG. 6. If the E bit in the first word of the command is 1, then MIN2 appears as a field in the next command. If the S bit in the first word of the command is also 1, then the serial number word WORD-C (FIG. 7) containing the ESN is the third word of the RECC message. If the E bit in the first word of the command is 0 and the S bit in the first word of the command is 1, then MIN2 does not appear and the serial number word WORD-C (FIG. 7) containing the ESN is the second word of the RECC message. Although the microcontroller 260 determines the logical state of the E and S bits and inserts MIN1 and MIN2 as appropriate, it is not ESN-aware and does not insert a value for the ESN. Instead, the base band processor 240 under control of the mask ROM 242 examines the S bit of the first word of the message. If the S bit is set, then the base band processor 240 also examines the E bit of the first word to determine whether to insert the ESN in the second word or in the third word of the RECC message. Since the microcontroller 260 may need to know the ESN under some circumstances, including for example diagnosis, service and maintenance, a command/report pair of instructions is provided to permit the microcontroller 260 to obtain the ESN from the base band processor 240.

The FIG. 2 embodiment remains vulnerable to attacks through its DSP-ESN memory interface, which is the connection between the base band processor 240 and the ESN memory 170. Placing the ESN memory in ROM within the DSP is a secure alternative, but is an expensive alternative because the ESN must be entered at time of manufacture. However, where the DSP rather than the host controller is responsible for ESN management, then another protective measure is possible. In this embodiment, a portion of the ESN unique to the manufacturer is recorded in the mask ROM of the DSP, e.g. the mask ROM 242 of the base band processor 240. This manufacturer-specific portion of the ESN is secure against cloning through the DSP-ESN memory interface, which defeats attempts to clone except to another chip of the same manufacture. This technique is extendible. For example, a larger portion of the ESN unique not only to the manufacturer but also to a mask of the DSP can be recorded in the mask ROM of the DSP, so that cloning is defeated except to chips of the same mask and manufacturer.

Interface Security Techniques Based on Encryption

Where the ESN-aware functional unit is the host controller, the interface between the interface between the host controller and the DSP is vulnerable. Whether the ESN-aware functional unit is the DSP or the host controller, the interface between the ESN memory and the ESN-aware functional unit is vulnerable. These interfaces are made secure by applying encryption techniques.

Figure 8:
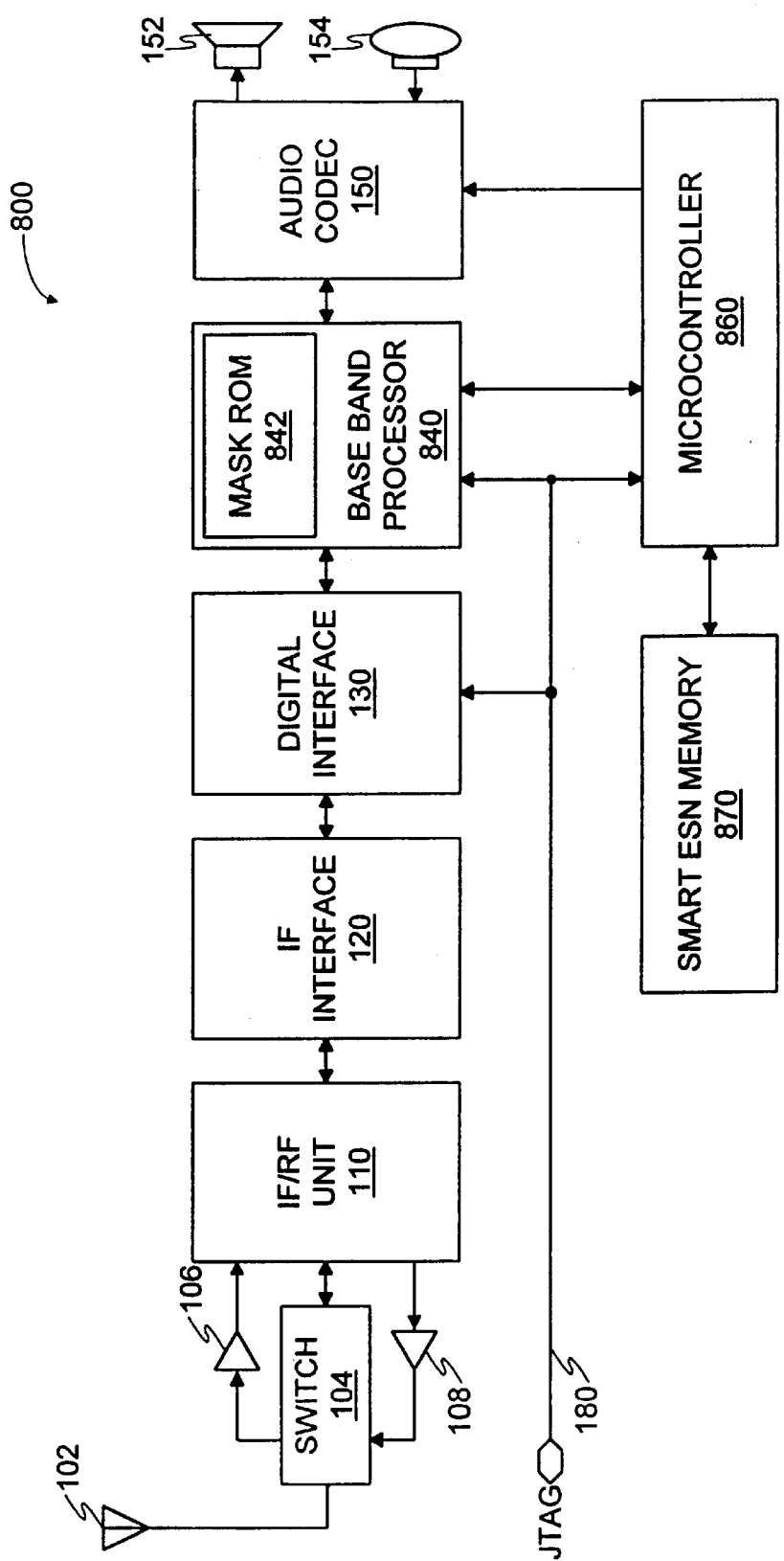
FIG. 8 is a flow chart of a method implemented on the architecture of FIG. 7.

FIG. 8 shows an architecture 800 in which the ESN-aware functional unit is a microcontroller 860. The base band processor 840 is not ESN-aware. However, both the microcontroller 860 and the base band processor 840 contain firmware that implements encoding and decoding of the ESN value, as follows. The base band processor 840 accesses data over a radio channel and constructs random numbers from the data using well known techniques. A variety of data is suitable for this purpose, including noise extracted from the RF signal. These random values, or private keys, are generated by the base band processor 840 and are operated on in a modulo conversion to create the public key. The public keys are sent to the microcontroller 860 in a message. The microcontroller 860 uses the values finished by the base band processor 840 as keys for encrypting the ESN using preferably a public key encryption scheme. For improved security, a second random number is encoded in the message from the microcontroller 860 to the base band processor 840, and the base band processor 840 sends back this random number as an acknowledgment. The microcontroller 860 decodes the message from the microcontroller 860 using the private key. The coding is difficult to break because the base band processor 840 requires a reply to come back in a few milliseconds, and each challenge issued by the base band processor 840 is different due to the random source for the keys. If the microcontroller 860 receives the wrong acknowledgment, it takes an appropriate action such as to abort operation and/or send an error reply to the base band processor 840. In this way, the encrypted value that is passed from the ESN-aware microcontroller 860 to the base band processor 840 changes each time, thereby providing a secure interface between these two functional units.

Figure 9:
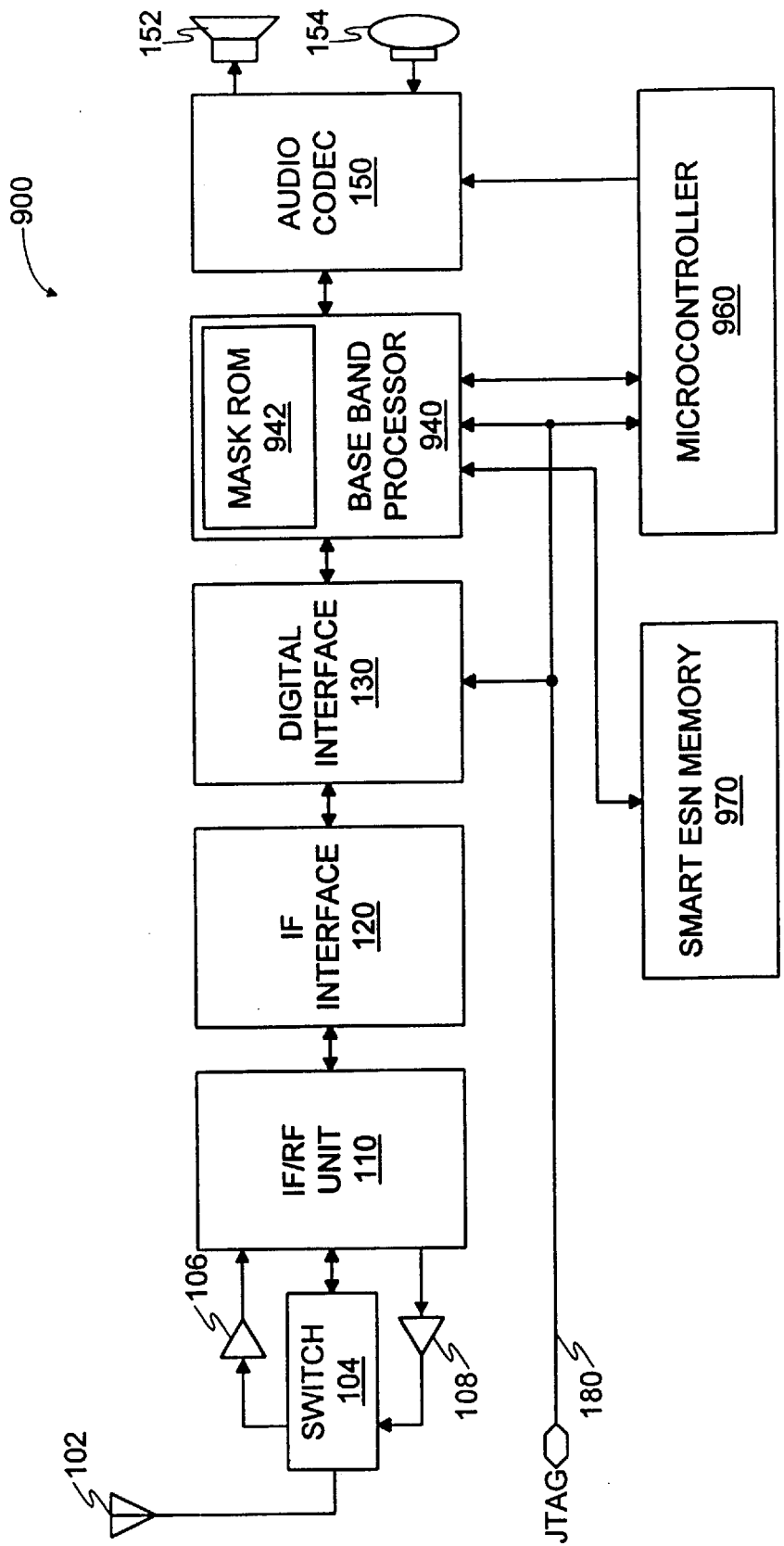
FIG. 9 is a flow chart of a method for validating a request to re-program an ESN.

Security at the ESN memory—ESN aware functional unit interface is achieved by providing a "smart" ESN memory that is capable of implementing data encryption techniques. Typically, memory such as Flash EPROM has no general computational ability, and general purpose microcontrollers typically used as the host have no nonvolatile memory. However, the smart ESN memories shown in both FIG. 8 and FIG. 9 contain a simple processor integrated with an onboard nonvolatile programmable memory. In FIG. 9 the ESN-aware functional unit is the base band processor 940, while in FIG. 8 the ESN-aware functional unit is the microcontroller 860. In the architecture 900 of FIG. 9, both the smart ESN memory 970 and the base band processor 940 contain firmware that implements encoding and decoding of the ESN value as described above for the interface between the base band processor 840 and microcontroller 860 (FIG. 8). In the architecture 800 of FIG. 8, the smart ESN memory 870 also contains firmware that implements encoding and decoding of the ESN value in the same manner as the base band processor 840 and the microcontroller 860. In this way, the encrypted value that is passed from the ESN-aware functional unit to the smart ESN memory 870 changes each time, thereby providing a secure interface between these units.

Protection Against Hacking

Before a mobile telephone can be cloned, the thief must employ a hacker to learn how to alter the ESN. Hacking involves trying different attacks that might change the ESN until one works. A hacker who has inside technical information may still very likely need to make many unsuccessful attempts before discovering all necessary details about how to alter the ESN. The TIA specifications and the FCC require that a mobile telephone disable itself upon detecting that its ESN or firmware has been altered. The motive of this rule is to make hacking more costly. A relatively small number of unsuccessful attempt should cost the thief the price of one mobile telephone.

In a technique applicable preferably to architectures that are capable of implementing ESN encryption, such as the architecture 800 of FIG. 8 and the architecture 900 of FIG. 9, the ESN-aware functional unit (the microcontroller 860 of FIG. 8 and the base band processor 940 of FIG. 9) stores a copy of the ESN in onboard volatile RAM memory. The ESN-aware functional unit generates random challenges to the smart ESN memory, which encodes the ESN and sends the encoded data and key back to the host. Tampering is detected when the data from the smart ESN memory fails to match data stored in the RAM of the ESN-aware functional unit. A suitable algorithm for this purpose is the knapsack algorithm, as described in Luke J. O'Connor, Jennifer Seberry, Cryptographic Significance of the Knapsack Problem, Aegean Park Press, Laguan Hills, Calif., 1988, which is incorporated herein by reference in its entirety. While both a host microcontroller and a DSP are suitable for determining whether the ESN has been altered, the DSP is preferred because it is more secure than the host microcontroller.

Figure 10:
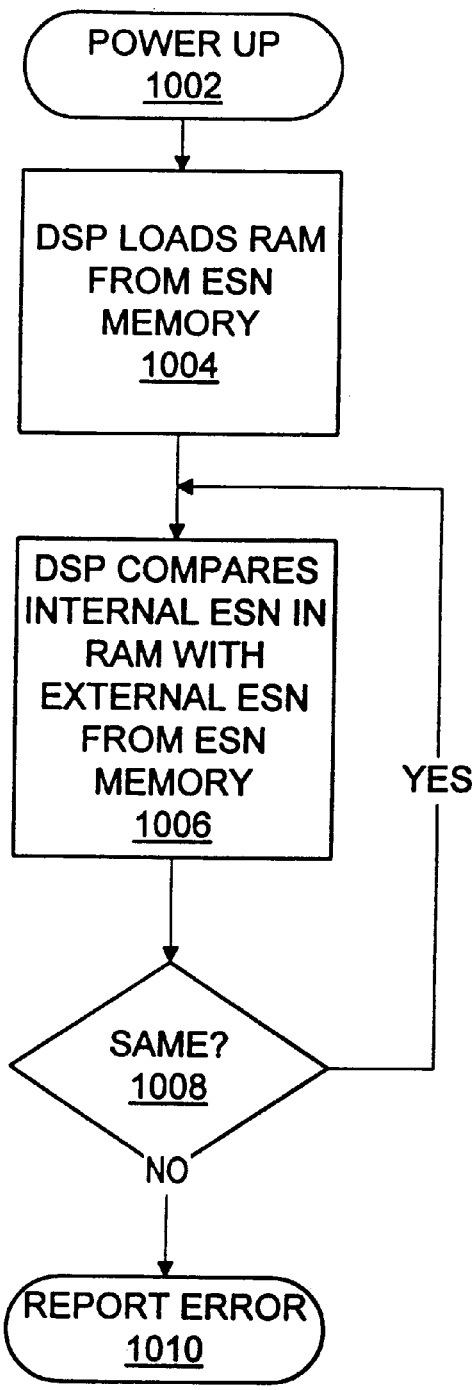
FIG. 10 is a flow chart of a method for protecting the JTAG interface to achieve ESN security.

The random challenge technique as implemented on the architecture 900 of FIG. 9 is shown in further detail in FIG. 10. After power up (step 1002) the base band processor 940 reads the ESN from the smart ESN memory 970, performing any necessary coding or decoding in the process, and loads the ESN in its own internal RAM (step 1004). When not otherwise busy, the base band processor 940 again reads the ESN from the ESN memory 970, performing any necessary coding or decoding in the process, and compares the external ESN value read from the smart ESN memory 970 with the internal ESN value stored in RAM (step 1006). If a hacker changes the ESN in the smart ESN memory 970 without also cycling power, then the internal ESN stored in the RAM of the base band processor 940 will differ from the external modified ESN stored in the external ESN memory 970 or provided through the memory-DSP interface. If a difference is detected (step 1008), an error is reported (step 1010) in any suitable manner.

FCC rules require that the mobile telephone be disabled when an altered ESN is detected. In the architecture 900 of FIG. 9, the base band processor 940 accomplishes this by taking the following measures. First, the base band processor 940 notifies the microcontroller 960 of the violation, which permits the microcontroller 960 to take whatever countermeasures it deems appropriate. Suitable countermeasures include storing some value in memory which will disable the telephone. Second, the base band processor 940 stores a code in the smart ESN memory 970 to indicate the violation. Preferably, the code includes a count of the number of attempts as well as the illegal value for the coded ESN. At initialization, the base band processor 940 tests the codes and treats detection of a past violation in the same manner as a new violation. Third, after taking the action items 1 and 2 above, the base band processor 940 waits until the next command from the host, thereby permitting the host time to take its countermeasures, and then enters a HALT or endless loop state. In effect, all operations are terminated.

The hacker may attempt to cycle power to avoid detection. However, this approach tends to make hacking very time consuming and expensive. It is desirable for boot-up for a mobile telephone to be at least a few hundred milliseconds in the best case, so that attempting even a few tens of thousand of different attacks by powering down each time to avoid detection would be time consuming. Moreover, either the base band processor 940 or the microcontroller 960 is capable of detecting excessive power cycling and taking defensive-action. The microcontroller 960 has access to a time-of-day clock while the ESN-aware base band processor 940 has access to programmable non-volatile memory in the smart ESN memory 970. At each power-up operation, the base band processor 940 notifies the microcontroller 960 of the event. The microcontroller 960 in turn keeps track of the frequency of DSP power-up operations, and takes defensive action in the event that the frequency exceeds some predetermined value. In an alternatively embodiment, the base band processor 940 is provided with access to a time-of-day clock and is programmed to keep track of the frequency of DSP power-up operations and take appropriate defensive action in the event that the frequency exceeds some predetermined value.

ESN Memory Device Security

Figure 11:
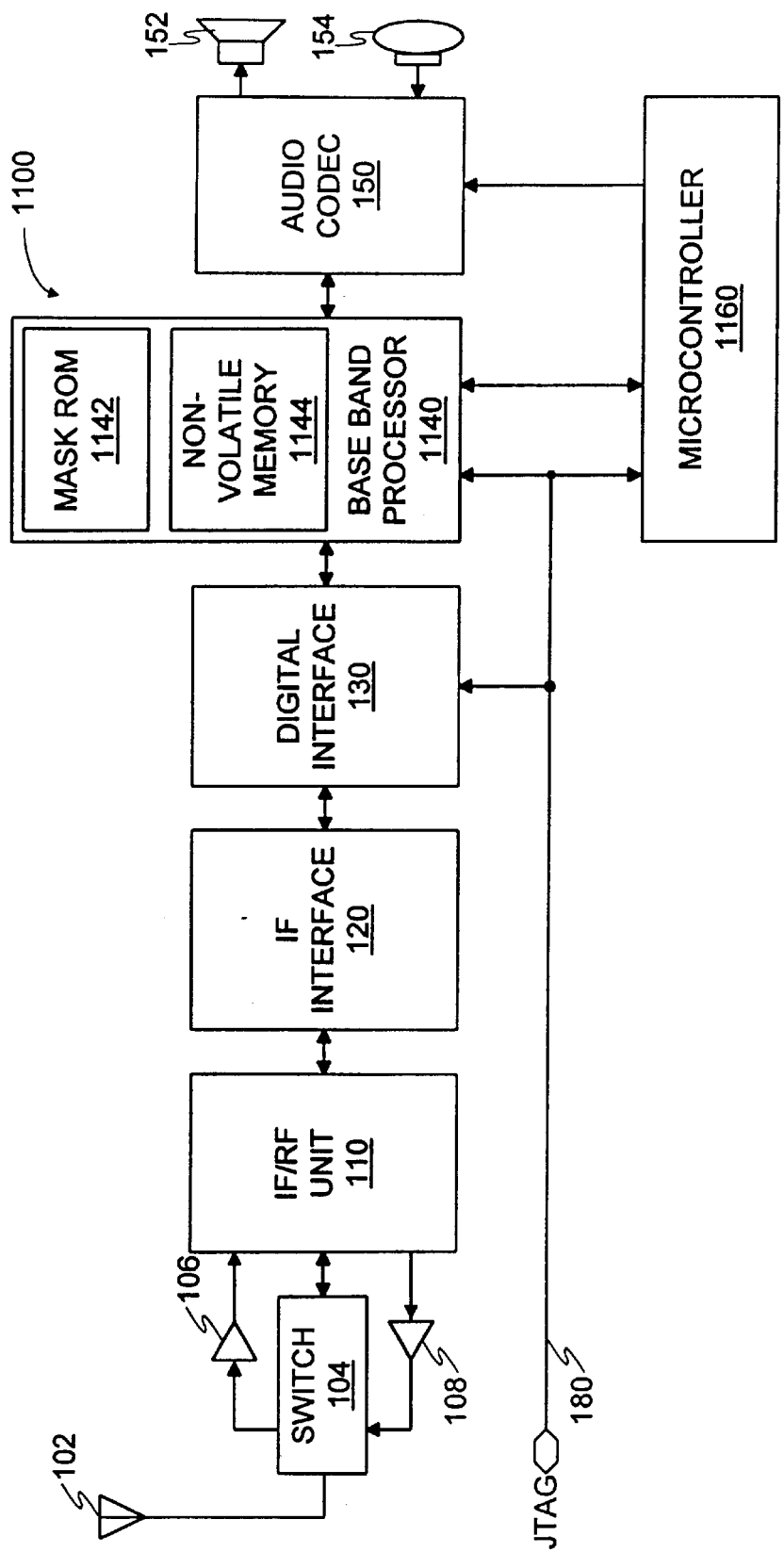
FIG. 11 is a schematic block diagram of an architecture that includes a base band processor.

If a mobile telephone uses a separate ESN-memory device, the memory device preferably is made physically secure. One physical security measure that eliminates the ESN memory—ESN aware functional unit interface involves placing the ESN memory within the ESN aware functional unit. For example, FIG. 11 shows an architecture 1100 that includes a base band processor 1140 that has onboard mask ROM 1142 and onboard field-programmable non-volatile memory 1144. The memory 1144 stores a value indicative of the ESN, preferably a value computed according to a well defined coding scheme that is known only to the base band processor 1140. Suitable coding schemes include calculating a polynomial based on the ESN and the MIN in a manner well known in the art, dividing the ESN into pieces and storing the pieces in different memory locations, and so forth. The mask ROM 1042 stores firmware instructions for controlling the ESN awareness and other operations of the base band processor 1040. Since the coding scheme used by the base band processor 1040 is fixed, the scheme is vulnerable to hacking. However, the risk that the coding scheme will be broken is minimized by changing the coding scheme with each mask of the base band processor 1040.

A physical security measure that hides the ESN memory—ESN aware function unit interface involves packaging the ESN memory using ball-grid array technology and placing the signal lines in the interior of a multi-layer board.

Figure 12:
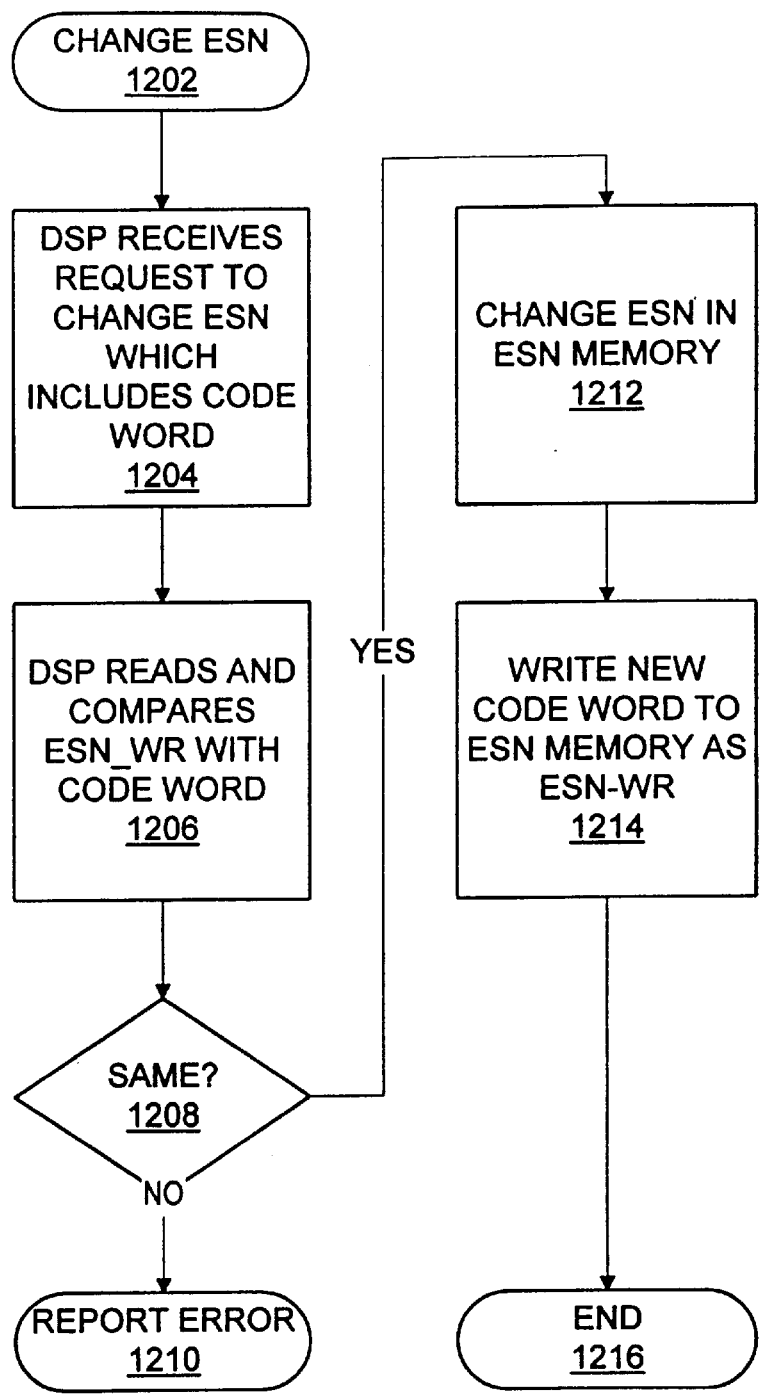
FIG. 12 is a flow chart of a method implementing ESN programming and validation.

When such physical security measures are used, the ESN-aware functional unit itself programs the ESN memory and validates any request to re-program the ESN memory. One technique for implementing ESN programming and validation is shown in the flowchart of FIG. 12. A word ESN_WR of the ESN memory is in a known initial state, preferably in an encrypted form. Any request to change the ESN must be accompanied with a code word (step 1204) which the DSP preferably encrypts and compares to the encrypted value in ESN_WR (step 1206). In the event of a match (step 1208), the ESN as well as ESN_WR are changed (steps 1212 and 1214). If the manufacturer wants to make the ESN unchangeable, then it changes ESN_WR to a random value which it intentionally loses so that the comparison (step 1206) almost certainly always fails (step 1210). If the manufacturer wants to be able to change the ESN at a later time, then the manufacturer can specify a code for ESN_WR which the manufacturer then is responsible for protecting.

Protection of the JTAG Interface

The JTAG interface renders the DSP vulnerable since it allows a thief to alter private data in any of the DSP registers, including the ESN. To alter private data, a thief sets a breakpoint in the DSP code and installs an interrupt handler to alter the data in the JTAG register prior to coding for transmission. A technique for protecting the JTAG interface involves comparing the private data indicative of the ESN in the DSP register with a reference value in memory just after JTAG data is coded and transmitted. Tampering is detected when the comparison fails.

To avoid detection, the thief would either have to set a second breakpoint after transmission of the JTAG data and change the private data back to its proper value, or would have to alter the reference value or values in memory. Setting a second breakpoint is possible, but it is time consuming since the JTAG interface is a relatively slow serial interface. Moreover, the debugging interface on some DSPs, including the DSP available in the aforementioned NEC IS-54 solution, typically permits only a single hardware breakpoint to be set at a time. Changing the breakpoint before the DSP begins comparing the private data with the reference data is difficult to accomplish reliably if the comparison occurs within one to two microseconds of loading the register. Changing the reference value held in memory is also possible, but is made more difficult if the reference value is encrypted or protected in some other manner such as dispersing it in memory. Security can further be enhanced by dispersing the ESN in the DSP memory or by using an encryption scheme that combines the ESN with the MIN and produces an unrecognizable third number.

Multiple Layers of Protection

A number of measures for protecting a mobile telephone from cloning are set forth herein. Preferably, several or all of these measures are implemented together. However, even if all of them are implemented, cloning of the mobile telephone would be possible but would also be expensive. The goal in combining the measures is to present a series of barriers that together raise the cost of penetration to the point where cloning is not cost effective.

A preferred combination of measures that achieves good security at reasonable cost is to make the DSP the ESN-aware processor/controller, and deter hacking by performing comparisons based on an ESN stored in the RAM of the DSP.

Encrypted Copy of Data

Several of the security measures described herein specify that coded or encrypted versions of data be placed in memory for the purpose of validating an un-encrypted value posing as the same data. There are a wide variety of ways to do this. The approach described below is merely illustrative, and serves as a vehicle for pointing out a few objectives which a suitable encryption technique should achieve.

Some data value E (an ESN or an ESN_WR value) is to be validated against some coded value E' that is saved in memory. To be effective, the algorithm for computing E' should be difficult to determine. A thief seeking to determine the algorithm for computing E' is likely to establish a hardware environment where E can be modified, perhaps a bit at a time, and where the value that the DSP computes for E' can be examined. From a large number of examples it may be possible to determine E' from E so that the DSP can be fooled. Some attributes of E that make determining E' difficult are: (1) E consists of a large number of bits; (2) there is no direct correspondence that changing a bit of E necessarily corresponds to changing particular bits of E'; and (3) E is not always coded by the same E'.

The following example illustrates how all of these objectives may be achieved without entailing a large computational load. Let us review a few facts from linear algebra. First, to every matrix E, singular or not, there corresponds a unique canonical form A·BE in row reduced form, where A is a non-singular square matrix. If E is a non-singular square matrix, then A will be $E^{-1}$. Note that individual entries in A are generally not determined by individual entries in E. Second, $A^{-1} \cdot A \cdot E = E$. Third, these properties apply to matrices over any field. In particular the entries can be integers with modulo-2 operations.

Let $f$ be any non-trivial function. To code a value F, first place the bits of $f(F)$ along with some randomly generated bits in a rectangular array. Compute A so that A·E is in row reduced form. Store A and A·E as the coded reference value for F. Note that A·E is a sparse matrix so it can be encoded compactly if desired.

When a new value F' must be tested against A, the DSP retrieves A, computes $A^{-1}$ and then $E = A^{-1} \cdot (A \cdot E)$. Finally it removes the random bits which had been introduced in known fixed positions in E to obtain $A^{-1} \cdot A \cdot E$ which can be compared directly against $f(F)$. Note that $f$ serves the purpose of disguising F' in case someone can watch the computation with a debugger.

Since the matrices are over the integers module 2, the matrix computations are simple. Rows of the matrices can be placed in registers and row operations become XOR computations. Thus little code-space or computational power is needed for these operations.

Public Key Encryption

One of the security measures described herein mentions that public key encryption is used in an exchange of data between the DSP and the ESN-memory processor/controller. There are a wide variety of techniques for public key encryption. The approach described below is merely illustrative.

Public key encryption usually involves multiple-word precision arithmetic. In turn, this suggests a heavy code-space load on the DSP. Another approach to public key encryption that imposes a significantly reduced code-space load on the DSP has long been known but has received little use because it is known not to be secure. This is the knapsack encryption scheme that is described for example by Gustavus Simmons in an article entitled "Symmetric and Asymmetric Encryption," ACM Computing Surveys, Vol. 11, Number 2, December 1979, pp. 305–330. Although it is known how to break these codes, the methods are statistical, depending on the availability of many sample encodings and much computing power. Accordingly, knapsack encryption is suitable for the security technique described herein provided that the coding scheme is changed for each data transfer, or at least every few data transfers, and that the thief is forced to break the code very quickly, and preferably within milliseconds.

In practice, to encode value with fewer than n bits, the DSP generates a random sequence of numbers and sum them to obtain $A_0, \ldots, A_n$ where in general, $$A_k \geq \sum_{i=0}^{k} A_i$$

The DSP chooses values e and d greater than 1 and computes m=e*d−1. The DSP also computes $V_0 = e \cdot A_k (\mod m), \ldots, V_n = e \cdot A_k (\mod m)$, rearranges them and sends them in increasing order, $V_{\pi(0)}, \ldots, V_{\pi(n)}$ to the ESN-processor/controller. The ESN-processor/controller in turn computes $$S' = \sum_{i=0}^{n} S_i \cdot V_{\Pi(i)}$$

where the sequence $s_0, \ldots, s_n$ includes the ESN and some random number. The ESN-processor/controller sends S to the DSP. The DSP in turn computes $$S = S' \cdot d (\mod m) = \sum_{i=0}^{n} S_i \cdot A_i$$

and then the sequence $s_{\pi^{-1}(n)}, \ldots, s_{\pi^{-1}(0)}$ by successively determining whether $A_k$ is larger than $$S = \sum_{i=k+1}^{n} S_{\Pi^{-1}(i)} \cdot A_i.$$

The DSP now extracts the ESN and the random number and sends the random number as an acknowledgment to the ESN processor/controller. If the ESN processor/controller receives the wrong acknowledgment or if it does not receive an acknowledgment in a reasonable amount of time then it should take action to disable the telephone. For example it can alter one copy of the ESN in its memory so as to force an error condition. It can also send an error message to the DSP so that the DSP can take immediate action to disable the telephone.

The descriptions of the embodiments set forth herein are illustrative, and are not intended to limit the scope of the invention. Variations and modifications of the embodiments may be within the scope of the invention. For example, authentication, which may be implemented in the future, requires private data and depends on protecting several words of data, not just the ESN. The techniques described here apply as well to protecting these other words, specifically SSD, AKEY and COUNT. As a further example, nonvolatile memory has been referred to herein for the storage of the ESN. EPROM, EEPROM and Flash memory are preferred for this purpose, but other types of nonvolatile memory as well as battery sustained DRAM and SRAM memory may be used. The scope of the invention is established by the claims that follow.

What is claimed is:

1. A clone-resistant apparatus using electronic serial number ("ESN") security, comprising:
   a host controller;
   a digital signal processor ("DSP") having a digital systems interface coupled to the host controller and a radio frequency interface;
   a radio frequency ("RF") section coupled to the radio frequency interface;
   an ESN memory coupled to the digital signal processor
   means for placing the ESN in a first or second position in a wide band data ("WBD") command;
   means for using a first binary value to identify whether the ESN is present in the WBD command;
   means for using a second binary value to identify whether the ESN is present in the first or the second position;
   means for examining the first binary value using the DSP to determine whether a substitution should be made; and
   means for examining the second binary value using the DSP to determine whether the substitution should be made to the first location or to the second location when the means for examining the first binary value indicates that a substitution should be made.

2. An apparatus as in claim 1 wherein the digital signal processor and the ESN memory are disposed in a common package.

3. An apparatus as in claim 1, further comprising means for issuing a command/report pair from the host controller following the second binary value examining step to obtain the ESN from the digital signal processor.

4. An apparatus as in claim 1 wherein the digital signal processor comprises a non-volatile memory, the ESN having a first portion resident in the non-volatile memory of the digital signal processor and a second portion resident in the ESN memory.

5. An apparatus as in claim 4 wherein the first portion of the ESN comprises a component that identifies a particular manufacturer.

6. An apparatus as in claim 4 wherein the non-volatile memory is a mask read only memory ("ROM").

7. An apparatus as in claim 4 wherein the first portion of the ESN comprises a first component that identifies a particular manufacturer and a second component that identifies a particular mask for the mask ROM.

8. A method for operating a clone-resistant apparatus using electronic serial number ("ESN") security, the clone resistant apparatus including: a host controller; a digital signal processor having a digital systems interface coupled to the host controller and a radio frequency interface; an RF section coupled to the radio frequency interface; a first ESN memory coupled to the digital signal processor; and a second ESN memory coupled to the digital signal processor, the method comprising:
   storing a first value indicative of the ESN in the first ESN memory;
   storing a second value indicative of the ESN in the second ESN memory;
   comparing the first and second values to determine whether the first and second values are equivalent;
   indicating an ESN security violation if the first and second values are determined not to be equivalent in the comparing step and notifying the host computer that an ESN security violation has occurred;
   pausing the digital signal processor for a time sufficient for the host computer to execute a countermeasure command; and
   placing the digital signal processor in a nonresponsive state.

9. A method as in claim 8 wherein:
   the first value indicative of the ESN is either the ESN or an encrypted version of the ESN; and
   the second value indicative of the ESN is either the ESN or an encrypted version of the ESN.

10. A method as in claim 8 wherein:
    the first value indicative of the ESN is the ESN; and
    the second value indicative of the ESN is an encrypted version of the ESN.

11. A method as in claim 8 wherein the countermeasure command is a system disable command.

12. A method as in claim 8 wherein the nonresponsive state is a halt state.

13. A method as in claim 8 wherein the nonresponsive state is an endlessly looping state.

14. A method for operating a clone-resistant apparatus using electronic serial number ("ESN") security, the clone resistant apparatus including: a host controller; a digital signal processor having a digital systems interface coupled to the host controller and a radio frequency interface; an RF section coupled to the radio frequency interface; a first ESN memory coupled to the digital signal processor; and a second ESN memory coupled to the digital signal processor, the method comprising:
   storing a first value indicative of the ESN in the first ESN memory;
   storing a second value indicative of the ESN in the second ESN memory;
   comparing the first and second values to determine whether the first and second values are equivalent;
   indicating an ESN security violation if the first and second values are determined not to be equivalent in the comparing step and storing an ESN security violation code in the first ESN memory;

testing the first ESN memory upon system initialization to detect whether an ESN security violation code is stored therein; and placing the digital signal processor in a nonresponsive state if the ESN security violation code is detected in the testing step.

15. A method as in claim 14 wherein the nonresponsive state is a halt state.

16. A method as in claim 14 wherein the nonresponsive state is an endlessly looping state.

17. A method for operating an apparatus having a host controller, an RF section, an ESN memory, and a digital signal processor having an internal RAM, a digital systems interface coupled to the host controller, a radio frequency interface coupled to the RF section, an ESN memory coupled to the digital signal processor and a memory interface coupled to the ESN memory, the method comprising:

storing a first value indicative of the ESN in the ESN memory;

storing a second value indicative of the ESN in the RAM;

comparing at power-up the first and second values to determine whether the first and second values are equivalent;

indicating an ESN security violation if the first and second values are determined not to be equivalent in the comparing step, the indicating including notifying the host computer that an ESN security violation has occurred pausing the digital signal processor for a time sufficient for the host computer to execute a countermeasure command; and placing the digital signal processor in a nonresponsive state.

18. A method as in claim 17 wherein:

the first value indicative of the ESN is either the ESN or an encrypted version of the ESN; and the second value indicative of the ESN is either the ESN or an encrypted version of the ESN.

19. A method as in claim 17 wherein:

the first value indicative of the ESN is the ESN; and the second value indicative of the ESN is the ESN.

20. A method as in claim 17 wherein the countermeasure command is a system disable command.

21. A method as in claim 17 wherein the nonresponsive state is a halt state.

22. A method as in claim 17 wherein the nonresponsive state is an endlessly looping state.

23. A method for operating an apparatus having a host controller, an RF section, an ESN memory, and a digital signal processor having an internal RAM, a digital systems interface coupled to the host controller, a radio frequency interface coupled to the RF section, an ESN memory coupled to the digital signal processor and a memory interface coupled to the ESN memory, the method comprising:

storing a first value indicative of the ESN in the ESN memory;

storing a second value indicative of the ESN in the RAM;

comparing at power-up the first and second values to determine whether the first and second values are equivalent;

indicating an ESN security violation if the first and second values are determined not to be equivalent in the comparing step wherein the indicating step comprises storing an ESN security violation code in the first ESN memory;

testing the first ESN memory upon system initialization to detect whether an ESN security violation code is stored therein; and placing the digital signal processor in a nonresponsive state if the ESN security violation code is detected in the testing step.

24. A method as in claim 23 wherein the nonresponsive state is a halt state.

25. A method as in claim 23 wherein the nonresponsive state is an endlessly looping state.

* * * * *